United States Patent [19]
Cohen et al.

[11] Patent Number: 4,985,901
[45] Date of Patent: Jan. 15, 1991

[54] METHOD AND DEVICE FOR EVALUATING THE SAFETY MARGIN OF A DIGITAL VIDEO SIGNAL

[75] Inventors: Hervé Cohen, Paris; Jean-Marie Fouillet, Neuilly Plaisance, both of France

[73] Assignee: Telediffusion De France, Paris, France

[21] Appl. No.: 368,722

[22] Filed: Jun. 21, 1989

[30] Foreign Application Priority Data

Jun. 21, 1988 [FR] France ................................ 88 08303

[51] Int. Cl.⁵ ........................ H04B 3/46; H04N 12/00
[52] U.S. Cl. .................................... 375/10; 371/20.1; 371/28; 358/139
[58] Field of Search ........................ 371/20.1, 20.4, 28; 375/10; 358/139

[56] References Cited

U.S. PATENT DOCUMENTS 4,887,279 12/1989 Odenheimer .......................... 375/10

Primary Examiner—Benedict V. Safourek
Assistant Examiner—Tesfaldet Bocure
Attorney, Agent, or Firm—Fleit, Jacobson, Cohn, Price, Holman & Stern

[57] ABSTRACT

A method and a device are provided for giving an indication on the safety margin offered by a digital video signal circulating on a parallel digital video interface in parallel with a clock signal. For that purpose, the process includes: (a) decoding the data signals with the clock signal in unaltered form; (b) decoding the data signals with the clock signal after a predetermined time shift has been introduced between them; (c) comparing data words obtained from the decoding steps (a) and (b); and (d) repeating steps (a)-(c) with a plurality of successive shifts and determining the minimum amount of shift which results in significant differences between the data words decoded with and without time shift.

6 Claims, 2 Drawing Sheets

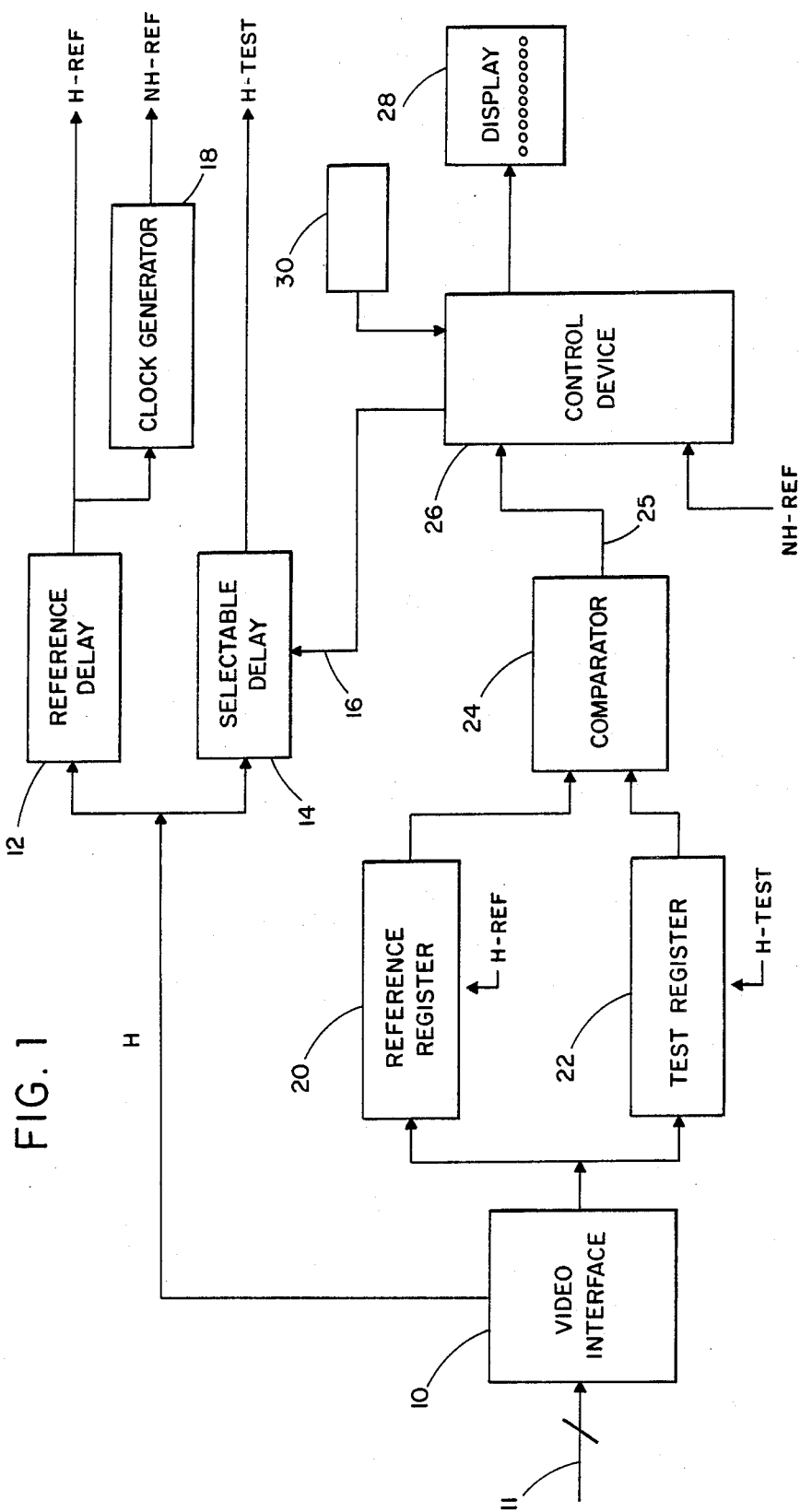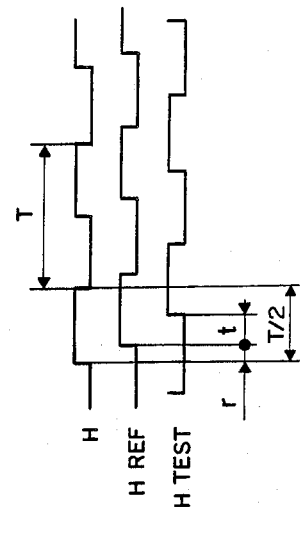

METHOD AND DEVICE FOR EVALUATING THE SAFETY MARGIN OF A DIGITAL VIDEO SIGNAL

BACKGROUND OF THE INVENTION

1. Technical Field

The invention relates to evaluating the safety margin offered by a digital video signal, on a parallel digital video interface, in case of phase variation between a clock signal and the data signals circulating in parallel relation. It finds a particularly important application in the construction of test tools for evaluating digital television equipment in accordance with recommendation 601 (studio digital television coding parameters) and 656 (interface for components of digital video signals for 525 and 625 line television systems) of the C.C.I.R.

Recommendation 656 of the C.C.I.R. defines a parallel digital video interface for passing of a digital video signal comprising a clock signal, formed by a 27 MHz square wave, and data signals which represent a data word bit at each up-going transition of the clock signal.

Evaluation of the safety margin of such a signal or of similar signals with respect to different types of degradation is useful in order to determine whether a particular piece of equipment, to be qualified, may be used in an equipment chain forming an installation. In fact, receiving equipment may be acceptable because it correctly decodes the data transmitted by a piece of equipment to be qualified, when it is located immediately at the output thereof. But such receiving equipment will however not operate correctly if it is separated from the equipment to be qualified by transmission equipment introducing additional degradations, for example a phase shift between the clock signal and the data signals or attenuation.

2. Prior Art

Different methods have already been proposed for evaluating the additional phase shift between the clock and data which the digital video signal received by an interface may accept without detrimentally affecting reception, i.e. the safety margin offered by the digital video signal.

A prior art method consists in measuring the maximum phase shift, with respect to reference positions, existing between each of the data signals and the clock signal, by using a two channel oscilloscope. But the evaluation thus obtained lacks accuracy, for the largest phase shift between the clock and data may occur very unfrequently, for example due to randomly occuring phenomena (phase jitter) and intersymbol interferences, and be hardly noticeable.

Another solution consists in displaying, for each of the data signal carriers, the eye pattern and its position with respect to the up-going edges of the clock signal and in deriving therefrom an evaluation of the tolerable additional phase shift. But obtaining the eye pattern generally involves applying a pseudo-random bit sequence to the input so as to explore all intersymbol interference (ISI) phenomena over all possible bit sequences. Although delivering a pseudo-random bit sequence to the input of the equipment is possible for certain equipments, such as a cable or a switching grid, it is not always so for an equipment which is a source of images, such a camera having an encoder.

Finally, these two methods involve making as many tests as there are data signal carriers in the interface.

SUMMARY OF THE INVENTION

An object of the invention is to provide a method and device for readily evaluating the safety margin of a digital video signal on a parallel digital video interface constituting the output of an item of equipment to be tested responsive to additional phase shifts between the clock signal and the data signals.

For that purpose, there is provided a method including: decoding the data signals, on the one hand, with the original clock signals and, on the other hand, after introducing a predetermined time shift between them; comparing the corresponding data words from the decoding in both cases; and repeating the operation with several successive shifts to determine the minimum amount of shift resulting in significant differences between the words received with and without shift.

This minimum amount of shift forms an evaluation of the safety margin of the digital signal.

The invention also provides a device suitable for implementing the above-defined method, comprising: means for generating, from the clock signal at the output of the interface, a reference clock signal having a fixed shift compensating the shift caused by the interface and a test clock signal having a selectable phase shift; two decoding registers receiving the data signal and having sampling inputs receiving respectively the reference clock signal and the test clock signal; a comparator connected to the output of the two registers and outputting a signal should there be difference; and control means for progressively increasing the amount of selectable phase shift and displaying, for each phase shift, the presence of differences or the number of differences.

It can be seen that the invention then makes it possible to determine the tolerance of a digital video signal to the phase shift possibly introduced by a processing channel, in a single sequence, since all data bits, i.e. all parallel data carriers, are taken into consideration at one and the same time.

It is possible to use the device without interrupting the transmission of data in an equipment channel: it is sufficient in fact to insert the device in the channel by connecting the parallel video-digital output interface of the device, on which the signal present on the parallel video-digital input interface is repeated, to the next equipment in the equipment channel of an installation. Due to the insertion and since the equipment to be evaluated need neither receive nor produce special signals, no interruption of the service during analysis phases is required.

The invention will be better understood from the following description of particular embodiments of the invention, given by way of non-limitative examples. The description refers to the accompanying drawings.

BRIEF DESCRIPTION OF THE DRAWINGS

FIG. 1 is a single-wire general block diagram of a device in accordance with a particular embodiment of the invention;

FIG. 2 is a timing diagram showing the signals which appear at different positions in the diagram of FIG. 1.

DETAILED DESCRIPTION OF PREFERRED EMBODIMENTS

Figure 3:
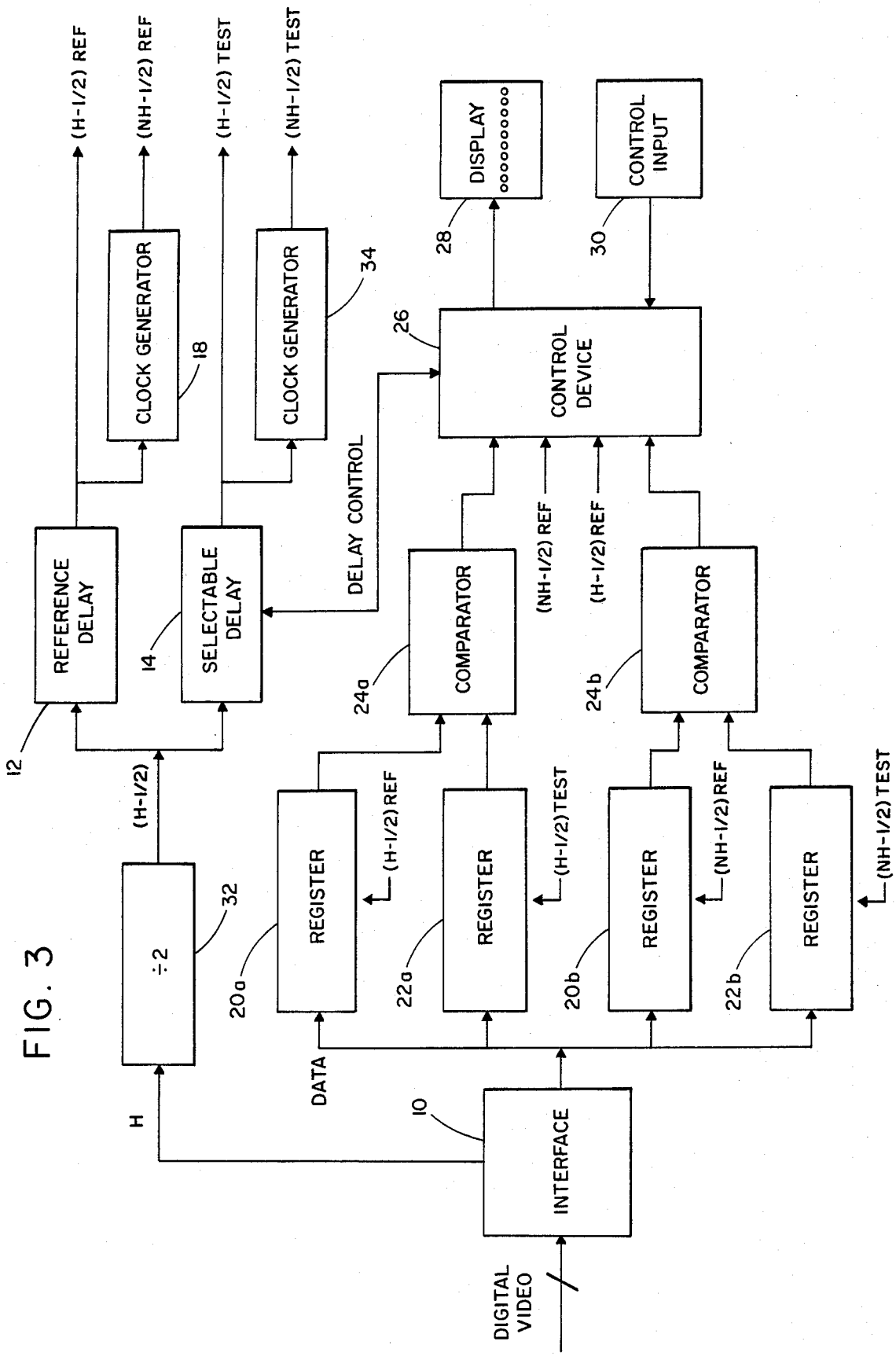
FIG. 3, similar to FIG. 1, shows a modification.

The device shown by way of example in FIG. 1 comprises a parallel digital video input interface 10, which will be assumed to be in compliance with recommendation 656 of the C.C.I.R., and which, for the sake of simplicity, will be designated simply hereafter by the term "input interface". During use of the device, the input 11 of the interface is connected to the output interface of the item of equipment to be analyzed (not shown).

The device of FIG. 1 makes it possible to evaluate the safety margin of the digital video signal applied in parallel form to input 11, i.e. the degree of immunity, to a phase shift between the clock signal and the data signals up to a maximum value T/2 where T designates the clock period, namely 1/27 of a microsecond.

The input interface 10 delivers the clock signal H (FIG. 1) to a channel comprising two parallel delay circuits 12 and 14. The delay circuit 12 delivers on its output a reference clock signal H REF having a fixed and predetermined delay r with respect to H (FIG. 2). The delay circuit 14 delivers on its output a signal H TEST with a delay which is adjustable by acting on a control input 16. An inverter 18 delivers, from signal H REF, a signal NH REF which is a square wave whose down-going transitions correspond to the up-going transitions of H REF.

The input interface 10 comprises a data output formed by a bus which feeds both a reference register 20 and a test register 22. These registers comprise clock inputs which respectively receive the signals H REF and H TEST and are arranged to store the data words received by them during the up-going transitions of these signals.

The delay r impressed by the delay circuit 12 is so selected that the up-going transitions H REF have the same position in time, with respect to the data signals applied to the input of the reference register 20, as the up-going transitions of the clock signal H with respect to the data signals applied to input 11 of the input interface 10. In practice, the delay r corresponds to the transit times of the data through interface 10.

It should be noted that, since the clock signals H REF and H TEST are periodical with a period T, it is possible to give to the shift t between the signals a positive value as well as a negative value, i.e. to give to the up-going transitions of H TEST not only an advance but also a delay with respect to the corresponding transitions H REF, within a range equal to $|T/2|$.

The data stored in registers 20 and 22 are applied to the two inputs of a comparator 24 which delivers at its output 25 a binary signal indicating whether all data are identical. This output is connected to a housekeeping device 26 which has signal processing and control functions. Clock signal NH REF is applied to the control device to cause transfer of the binary output signal of comparator 24 into the memory of the device during the up-going transitions of NH REF, so after the up-going transitions of H REF and H TEST corresponding to a same data word.

The control device 26 in particular controls the delay (r+t) of H TEST with respect to H and controls the display of the results on a display unit 28. The control device may be arranged to maintain a predetermined delay t during a selected time interval sufficient to give a significant result, then to increase the amount of time delay for a new check. The device thus determines, for each delay t, if there is mutual identity of the words delivered by registers 20 and 22. The control device may for example be adapted to provide phase shifts having all the successive whole values between −15 nanoseconds and +15 nanoseconds, each delay t being maintained for a comparison time interval of 100 μs.

The display unit may have different construction. It may for example comprise a row of display points, which can each be illuminated in red or green by a separate source and each corresponding to a given phase shift t. Initially, all green sources are lit. Then, for each phase shift t, the control device 26 delivers to the display unit the address of a corresponding display point and an information maintaining the green source lit if all the comparisons have revealed identity of the output signals of registers 20 and 22, replacing it by the red source if at least one of the comparisons (or in other cases, a minimum number of comparisons) has indicated a discordance. If energization of a red source is made permanent, the number of points illuminated in red can only increase as an evaluation proceeds.

Following an estimation sequence, the indications given by the display unit are to be cleared: for that, a manually controlled interface 30 may be provided for delivering to the control device 26 a reset signal which causes all the points of the display device 28 to be illuminated green.

Interpretation of the results given by the device which has just been described is very simple: the extent of adjacent points illuminated in green, comprising as a general rule the middle point corresponding to a zero phase shift t, gives an indication of the tolerance of the signal. The phase advances and delays which are tolerable by the signal correspond to the limits of the interval defined by the endmost left and right green sources.

In some cases, it is desirable to be able to determine the tolerance of the signal to phase shifts between clock H and the data exceeding T/2. Then the device shown schematically in FIG. 3 (in which the elements corresponding to those of FIG. 2 are designated by the same reference numbers) may be used.

The device of FIG. 3 essentially differs from that of FIG. 1 in that it uses an internal clock signal $(H-\frac{1}{2})$ at half the frequency of the clock signal H of the video signal, so at 13.5 MHz, and two comparison branches rather than one.

For that, the device shown in FIG. 3 comprises a generator of a clock signal $(H-\frac{1}{2})$ at half the frequency of the output signal H of interface 10. Generator 32 may be formed as a simple divider. It drives two delay circuits 12 and 14 connected in parallel and fulfilling the same function as the corresponding circuits of FIG. 2. An additional inverter circuit 34 is provided for delivering a signal $(NH-\frac{1}{2})TEST$ which is reverse of the signal $(H-\frac{1}{2})TEST$ delivered by the selectable delay circuit 14. The delay circuit 14 is arranged so as to obtain a positive or negative delay which may reach T with respect to clock $(H-\frac{1}{2})REF$, and no longer T/2 only.

The data signal from the input interface 10 drives two parallel branches instead of a single one in FIG. 1. The two branches have the same construction. The first one comprises a reference register 20a and a test register 22a whose clock inputs respectively receive clock signals $(H-\frac{1}{2})REF$ and $(H-\frac{1}{2})TEST$. A comparator 24a delivers a binary signal indicating whether the contents of registers 20a and 22a are identical or not during up-going transitions of signal $(NH-\frac{1}{2})REF$.

The clock inputs of registers 20b and 22b of the other branch receive the signals (NH−½)REF and (NH−½)TEST and the result of the comparison in comparator 24b is delivered to the control device 26 during the up-going transitions of the signal (H−½)REF.

Operation of the device of FIG. 3 is very similar to that of FIG. 1 except that two comparisons are made for each data signal. The control device 26 is provided for indicating a lack of tolerance to a phase shift as soon as one or other of comparators 24a or 24b indicates a lack of identity for this phase shift.

Since the phase shift t between the clock signal and data signal whose effect may be evaluated has a larger amplitude than in the case of FIG. 1, different variation steps of the phase shift may often be adopted. It will for example be possible to adopt limit phase shifts of −34 ns and +34 ns. It is difficult to exceed these values because it is necessary to reserve a minimum time between the triggering of write-in of a data word in registers 20 and 22 and taking into account the result of the comparison between the data words. The minimum time period depends on the components used. It is necessary for the output data word from register 20 or 22 to be well stabilized during the comparison, namely during the up-going edge of the signal (NH−½)REF or (H−½)REF. Similarly, in the case of FIG. 1, it is not possible to reach −18.5 and +18.5 ns.

The invention is not limited to the particular embodiments which have been described by way of examples. In particular, the control device 26 may be arranged for presenting the results under a different form: the passage of a display point from green to red in the display device 28 may be reversed, so that the lack of tolerance is only indicated if it exists during the most recent comparison time for the phase shift corresponding to the point. The control device may also comprise a microprocessor for interrupting the measurement sequence with increasing phase shift as soon as lack of tolerance is detected. The degree of tolerance, i.e. the safety margin, may be given in digital form in actual value or with reference to a given threshold.

We claim:

1. A process for evaluating the safety margin offered by a digital video signal circulating on a parallel digital video interface in parallel with a clock signal, comprising the steps of:
   (a) decoding the data signals with said clock signal in unaltered form;
   (b) decoding the data signals with the clock signal after a predetermined time shift has been introduced between them;
   (c) comparing data words obtained from the decoding steps (a) and (b); and
   (d) repeating steps (a)–(c) with a plurality of successive shifts and determining the minimum amount of shift which results in significant differences between the data words decoded with and without time shift.

2. A process according to claim 1, wherein during step (c) all bits of each of said data words are subjected in parallel to comparison.

3. A device for evaluating the safety margin offered by a video signal consisting of digital data circulating with a clock signal on a parallel digital video interface, comprising:
   means for generating, from the original clock signal at the output of the interface, a reference clock signal having a fixed amount of time shift with respect to the original clock signal compensating for the time shift caused by the interface and a test clock signal having a selectable phase shift with respect to the reference clock signal;
   two decoding registers receiving the data signal and having sampling inputs receiving respectively the reference clock signal and the test clock signal;
   comparator means connected to the outputs of the two registers and arranged to deliver a signal responsive to a difference between said outputs; and
   control means for progressively increasing the amount of selectable phase shift and displaying, for each phase shift, the presence or number of differences.

4. A device according to claim 3, wherein said control means are arranged to take into account the output of said comparator upon occurence of edges of the reference clock signal which are opposed to the transitions which cause operation of the respective decoding register.

5. A device according to claim 3, wherein said control means are arranged for controlling said means which generate the test clock signal and modifying the phase shift at regular intervals.

6. Device according to claim 5, further comprising a display unit connected to the control means and arranged to deliver a tolerance indication for each of a plurality of phase shifts successively impressed to the test clock signal by the control means.

* * * * *